US007099659B1

(12) United States Patent
Schnake et al.

(10) Patent No.: US 7,099,659 B1
(45) Date of Patent: Aug. 29, 2006

(54) METHOD AND SYSTEM FOR MANAGEMENT OF MESSAGES

(75) Inventors: Noel Schnake, Olathe, KS (US); Brian J. Finnerty, Olathe, KS (US); Joe Gilborne, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 776 days.

(21) Appl. No.: 09/874,215

(22) Filed: Jun. 5, 2001

(51) Int. Cl.
*H04M 3/00* (2006.01)

(52) U.S. Cl. ............... 455/419; 455/414.1; 455/414.2; 455/414.3; 455/420

(58) Field of Classification Search ................ 455/419, 455/466, 456, 452, 414.1; 705/14, 30, 26, 705/1, 7, 9, 27
See application file for complete search history.

(56) References Cited

U.S. PATENT DOCUMENTS

| 5,557,721 A | 9/1996 | Fite et al. |
| 5,577,103 A | 11/1996 | Foti |
| 5,740,549 A | 4/1998 | Reilly et al. |
| 5,768,276 A | 6/1998 | Diachina et al. |
| 5,815,506 A | 9/1998 | Gokhale |
| 5,848,397 A * | 12/1998 | Marsh et al. ................. 705/14 |
| 5,852,775 A | 12/1998 | Hidary |
| 5,909,651 A | 6/1999 | Chander et al. |
| 5,950,125 A | 9/1999 | Buhrmann et al. |
| 6,009,409 A | 12/1999 | Adler et al. |
| 6,021,433 A | 2/2000 | Payne et al. |
| 6,047,327 A | 4/2000 | Tso et al. |
| 6,119,014 A * | 9/2000 | Alperovich et al. ......... 455/466 |
| 6,636,888 B1 * | 10/2003 | Bookspan et al. .......... 709/203 |
| 6,725,460 B1 * | 4/2004 | Nishiyama et al. ........... 725/32 |
| 6,728,530 B1 * | 4/2004 | Heinonen et al. ......... 455/414.1 |
| 6,816,577 B1 * | 11/2004 | Logan ....................... 379/67.1 |

FOREIGN PATENT DOCUMENTS

| EP | 0 981 252 A2 | 2/2000 |
| GB | 2 349 302 A | 10/2000 |
| WO | WO 99/59283 | 11/1999 |
| WO | WO 00/28750 | 5/2000 |

\* cited by examiner

*Primary Examiner*—Joseph Feild
*Assistant Examiner*—Julio Perez

(57) ABSTRACT

A method and system for managing message-presentation in a subscriber station. A message and a time-based schedule for the presentation of the message are sent over a communications network to the subscriber station. As a response to this, the subscriber station may responsively present the message according to the time-based schedule. Further, a schedule-change order may be sent to the subscriber station to change the time-based message-presentation schedule. Such a change may, for instance, substitute a substitute-schedule for the original schedule, alter a schedule for presentation, or delete a schedule.

30 Claims, 8 Drawing Sheets

| 202 | 204 | 206 | 208 | 210 | 212 | 214 |
|---|---|---|---|---|---|---|
| Version Number | Control Inst Type | Control Inst Size | Authentication | Source | Control Instruction Element | CRC |

METHOD AND SYSTEM FOR MANAGEMENT OF MESSAGES

FIELD OF THE INVENTION

The present invention relates in general to telecommunications networks and more particularly to schedules for message presentation.

BACKGROUND

Recent advances in telecommunications technology have allowed a wide array of special telecommunication services to be made available to subscribers. Through the advent and acceptance of wireless communications (such as cellular telephony for instance) and Internet communications, it is now commonplace for a person to receive messages at virtually any location and any time of day. Though these messages are often sent by the subscriber's established personal or business concerns, they may also be sent by others—including those who wish to advertise products, services, or political or social opinions.

Moreover, senders may wish to access a subscriber's microbrowser application, which is in some sense a scaled-down version of a conventional web browser, to convey a greater range of content and options to a subscriber. The microbrowser typically employs a wireless markup language (WML), such as HDML (handheld device markup language) or WAP (wireless access protocol). In WML, information is conveyed to a microbrowser in the form of decks of "cards" from a WML server on a network, and individual cards are presented to a user. Often, a WML digest will be sent to the user containing decks of cards and/or images for presentation to a user. These cards are defined by a underlying code and are somewhat analogous to HTML pages now commonplace on the World Wide Web. However, each card is greatly scaled down and specialized to facilitate presentation to a user via a small display screen.

Furthermore, many senders may wish to send a variety of messages to a subscriber, and as a result, users may tend to be overwhelmed with incoming and outgoing messages of all sorts, such as short message service (SMS) messages, e-mail messages, voice mail messages, and the like. Senders trying to distinguish themselves may wish to present messages to a subscriber at certain times or on certain days.

SUMMARY

In a first principal aspect, the present invention provides a method for managing message-presentation in a subscriber station. A message and a time-based schedule for the presentation of the message are sent over a communications network to the subscriber station. As a response to this, the subscriber station may present the message according to the time-based schedule.

In a second principal aspect, the present invention provides for first sending a message and schedule for presentation of the message via a communications network to the subscriber station. The subscriber station may store the message and schedule, and the subscriber station may be programmed to present the message according to the schedule. Next, the invention provides for sending a schedule-change order to the subscriber station. The schedule-change order defines a change to the schedule for presentation of the message.

Subsidiary aspects of the invention provide for sending a substitute-schedule, which may replace the schedule previously sent to the subscriber station. Another subsidiary aspect provides for defining scheduling parameters in a schedule, corresponding to a date/time to present the message, to start presentation of the message, or to end presentation of the message.

The scheduling parameters may also include a duration for presenting the message, a number of times to present the message, or a frequency of presentation of the message.

A further aspect of the invention provides for sending a reporting request to the subscriber station that requests data concerning presentation of at least one message, and for receiving from the subscriber station a report with data concerning presentation of at least one message.

These as well as other advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 3 is a block diagram of a control instruction, in accordance with the exemplary embodiment;

FIG. 4 is a block diagram of a sample time-based schedule utilizing single display periods, in accordance with the exemplary embodiment;

FIG. 5 is a block diagram of a sample time-based schedule utilizing recurring display periods, in accordance with the exemplary embodiment;

DETAILED DESCRIPTION OF AN EXEMPLARY EMBODIMENT

Figure 1:
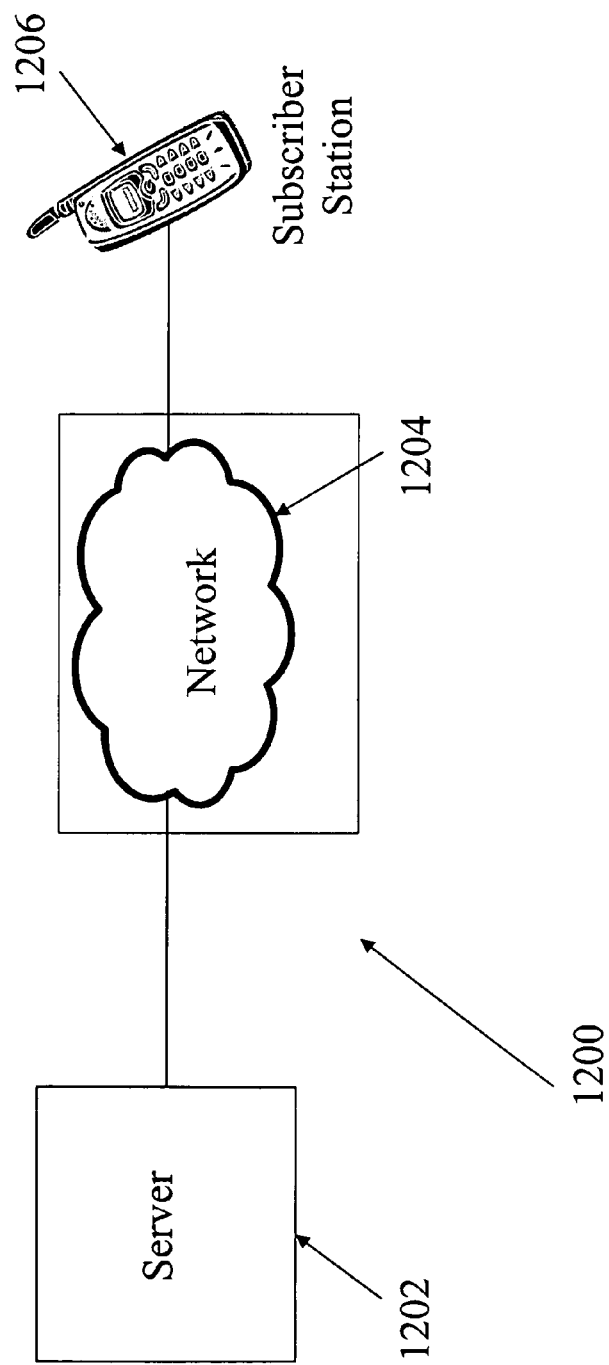
FIG. 1 is a block diagram of a system including a server and a subscriber station connected by a network, in accordance with the exemplary embodiment.

Referring to the drawings, FIG. 1 illustrates a system 1200 in which an exemplary embodiment of the present invention can be employed. It should be understood that this and other arrangements and processes described herein are set forth for purposes of example only, and other arrangements and elements (e.g., machines, interfaces, functions, orders of elements, etc.) can be used instead and some elements may be omitted altogether. Further, as in most telecommunications applications, those skilled in the art will appreciate that many of the elements described herein are functional entities that may be implemented as discrete components or in conjunction with other components, in any suitable combination and location. Still further, many of the functions described can be carried out by software, firmware and/or hardware, such as by an appropriately programmed processor.

As shown in FIG. 1, system 1200 includes a server 1202 communicatively linked via a network 1204 to a subscriber station 1206. The network 1204 may be a circuit-switched or packet-switched data network that may be wired, wireless, or some combination of the two. Preferably, the interface between the network 1204 and the subscriber station 1206 may be an air interface. This air interface may be any type of wireless interface known in the art. For example, it may be a cellular radio-frequency interface of the type provided by Sprint PCS and other companies. As such, the network 1204 may contain a number of base stations for transmission and reception of data between the network 1204 and the subscriber station 1206.

In the exemplary embodiment, the server 1202 may send a control instruction across network 1204 to a subscriber station 1206. The control instruction preferably concerns a schedule for presentation of a message, and the server may send the control instruction to the subscriber station either before, after or concurrently with the underlying message.

In one embodiment, the control instruction presents a time-based schedule for presentation of a message. In another embodiment, the control instruction may change an existing time-based schedule through the use of a schedule-change order that defines the change to the schedule. The control instruction may also include a substitute-schedule to replace an existing schedule, and an appropriate schedule-change order may be used to convey the substitute schedule. The substitute or initial time-based schedules may also be conveyed in an appropriate schedule-order. Further, a cancellation-order may be sent to the subscriber station 1206, instructing it to delete an existing schedule. This may optionally be done in conjunction with a schedule-order defining a substitute schedule.

Figure 2:
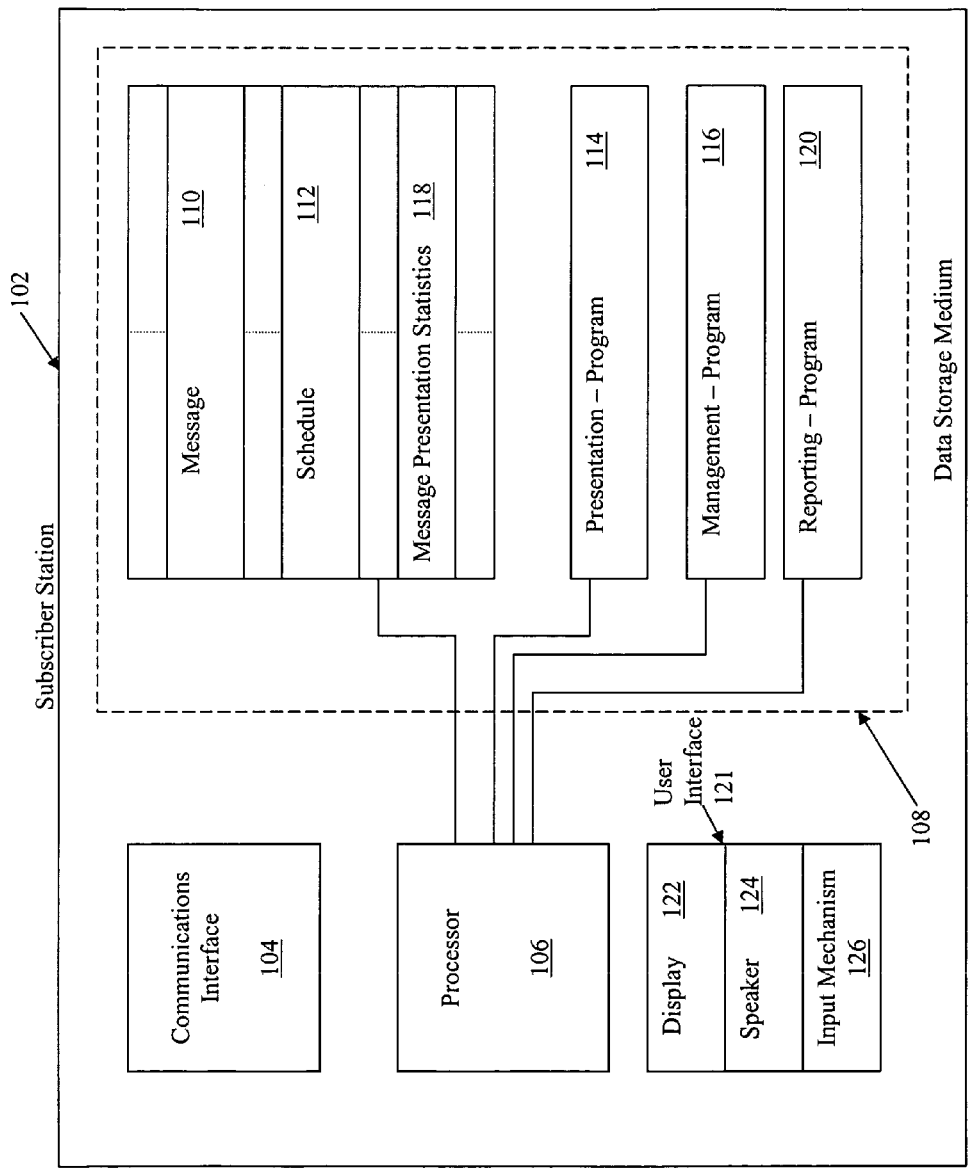
FIG. 2 is a block diagram of a subscriber station with a message and presentation schedule, in accordance with the exemplary embodiment.

Turning now to FIG. 2, that figure discloses a subscriber station 102 that comprises a communications interface 104, a processor 106, a data storage medium 108 and a user interface 121. The data storage medium 108 may be comprised of Random Access Memory (RAM) microchips, Read Only Memory (ROM) microchips, or other data storage media known in the art. The data storage medium 108 includes a stored message 110 and a stored time-based schedule 112 for presentation of the message. These may be stored in volatile and/or non-volatile memory.

The data storage medium 108 also includes a presentation-program 114 for presenting the message 110 according to the schedule 112. The schedule 112 is time-based in that it provides message presentation periods based on a time schedule. For example, the time-based schedule 112 may provide a message presentation period with respect to, for example, the local date and/or time of the subscriber station (e.g., Jul. 31, 2001, 3:00 PM to 4:00 PM, Central Standard Time). The time-based schedule 112 may also provide a presentation period with respect to other time zones or any other calendar-related denotation (e.g., the third Tuesday of every month). Examples of some of the time-based denotations will be provided below.

The presentation-program 114 may be accessed by the processor to assist in displaying the message 110 at the appropriate time. The presentation-program 114 may optionally access a display mechanism of the subscriber station 102 to direct presentation of the message 110, or the processor 106 may activate the display functionality. The presentation-program 114 may reside in volatile and/or nonvolatile memory.

A management-program 116 is also included in the data storage medium 108. The management-program 116 may be executed upon receipt of a schedule-change order-such as a Schedule control instruction or a Cancel Particular Schedule control instruction described below—to alter the message-presentation schedule 112 for the message 110. This act of altering may include deleting an original schedule and replacing it with a new schedule, adding another schedule to pre-existing schedule(s), or adding a new schedule where no message-presentation schedule currently applies. Optionally, the management-program 116 may also respond to a cancel-order to cancel a particular message-presentation schedule 112 and a schedule-order to store a substitute-schedule in the data storage medium 108. Thus, the cancel-order and schedule-order may combine to mimic the functionality of the above-mentioned schedule-change order. The management-program 116 may also reside in volatile and/or nonvolatile memory.

The data storage medium 108 may also include message-presentation statistics 118 and a reporting-program 120. The message-presentation statistics 118 may include a number of times: particular message was presented, a web link was activated through a message, a voice call was placed through a message, a page within the message was accessed, or other desired event occurred. The reporting-program 120 may also reside in volatile or nonvolatile memory, and it may be executed by the processor 106 when a reporting-request is received. The reporting-program 120 is executed to send the message-presentation statistics 118 to a remote network entity via the communications interface 104.

The user interface 121 comprises a display 122, a speaker 124, and an input mechanism 126. The display 122 may be a color or non-color display, a liquid crystal display or other type of display. The speaker 124 may be any type of speaker for producing sound known in the art. The speaker 124 may also comprise a vibrating mechanism for vibrating the subscriber station at appropriate times. The input mechanism 126 may be a keypad—like that of a cellular phone—a touch-sensitive screen—like that of many personal digital assistants—a keyboard, a microphone or any other input device that a user may use to interact with the subscriber station.

Turning now to FIG. 3, that figure discloses a sample control instruction structure 200. In this embodiment, the structure 200 includes a version number field 202, a control instruction type field 204, a control instruction size field 206, an authentication field 208, a source field 210, a control instruction element field 212, and a Cyclic Redundancy Check ("CRC") field 214.

The version number field 202 may define the version of the protocol. In the preferred embodiment, the version number field 202 is 8 bits, or 1 byte, long, allowing up to 256 different version denotations. As with all of the fields herein, this field may lend itself to a particular number of bits or to a single bit, but any number of bits or any method of storing the pertinent information may be used. Further, none of the fields noted in the embodiments herein are required to practice the invention. For instance, the invention may be practiced without using the concept of "fields", as noted herein. In this way, they are only illustrative of some preferred and alternate embodiments.

The control instruction type field 204 defines the type of information which is being sent to the subscriber unit. A variety of control instruction types are disclosed below. Up to 128 unique control instruction types may be defined using a single byte, and up to 32,768 using two bytes.

The control instruction size field 206 defines the total size of the control instruction in bytes, once all segments have been concatenated. The theoretical maximum size using 3 bytes is 16,777,215 bytes, although system and subscriber station constraints may make the practical limit much lower.

The authentication field 208 is preferably a three-byte field. The authentication code may be determined by the particular carrier of the control instruction. Control instructions that do not require authentication may use a default Authentication code of 0x000000. The source field 210 may consist of an IP or other type of network address, which may preferably be represented in 4 bytes.

The control instruction elements field 212 may be populated by elements according to the rules for the particular control instruction type, as discussed below. A 16-bit CRC is calculated on all bits of the control instruction, excluding the bits of the CRC field 214 itself. If the subscriber station computes a CRC that does not match the CRC field 214, all segments comprising the constructed message should preferably be ignored and discarded. One may note that while data integrity is theoretically guaranteed by the lower layers, the CRC may provide a useful means to ensure that control instruction segments are reconstructed properly.

The control instruction type field 204 comprises a one byte field which denotes the type of control instruction which is conveyed by the short message. This field may comprise any number of bytes, depending on the number of types of control instructions one desires to send. In a one byte implementation, up to 128 control instructions may be defined and denoted, and in a two byte implementation, up to 32,768 control instructions may be defined and denoted. Table 1, below, provides a number of sample control instruction types and sample corresponding values for those control instruction types. Again, these sample control instruction types in the form illustrated herein are merely illustrative of an exemplary way to practice the invention.

TABLE 1

| Control Instruction Type | Value |
| --- | --- |
| Schedule | 0 × 01 |
| Advertisement Digest | 0 × 02 |
| Cancel Particular Schedule | 0 × 04 |
| Cancel Particular Advertisement | 0 × 0A |
| Cancel All Advertisement | 0 × 0B |
| Advertising Statistics Request | 0 × 10 |

In the embodiment of Table 1, the most significant bit is reserved as an extended-length indicator should the number of control instruction types exceed 128. Also, additional control instruction types which may be defined in further embodiments may be appended after the control instruction types shown here, to allow for backward-compatibility.

In the "Schedule" type control instruction—Control Instruction Type 0x01—the Control Instruction Information Elements field 212 may contain details of a schedule for the presentation of a message. The schedule may outline run times for the message. Preferably, each schedule is stored in a separate database field in the memory of the subscriber station. Optionally, each schedule may be stored in a master schedule in the memory of the subscriber station. Such a master schedule may contain, in a central memory location, all of the schedules for each individual message. The subscriber station may keep the master schedule in addition to individual schedules stored in separate database fields or in place of individual schedules stored in separate database fields. An example of the contents of the Control Instruction Information Elements field 212 for a Schedule control instruction may be found in Table 2.

TABLE 2

| Field Name | Size (in Bits) |
| --- | --- |
| Ad ID | 32 |
| Start Time | 32 |
| Expiration Time | 32 |
| User Discard | 1 |
| Audio Alert | 1 |
| Single Run | 1 |
| Run Times | 5 |
| Rotation Timer | 6 |
| GMT Reference | 1 |
| Reserved | 1 |
| Day of Week | 3 |
| Recurring Days | 7 |
| Start Time of Day | 11 |
| Duration Time of Day | 11 |

The "Ad ID" field identifies the message that is associated with the schedule. Each schedule may have an Ad ID, and each message may also have an Ad ID. The schedule may be associated with the message if the schedule and message have the same Ad ID. Preferably, the message to be presented is an advertisement, and such an advertisement may comprise an advertisement for products, services, a political position, or other concept for which advertising is typically presented. The message may also comprise a reminder—for instance a birthday or anniversary reminder—any other audio, visual, or otherwise sensed information. Moreover, in the preferred embodiment, the advertisement may be stored in a separate database record in the subscriber station memory.

Preferably, there may be more than one schedule per advertisement, and this may allow display times to be added to the existing display times for a particular advertisement without having to resend a new schedule with all desired display times for the advertisement.

This particular embodiment uses a 32 bit, or 4 byte, identification field. The "Start Time" field provides the absolute start time of the advertisement. Here, Global Positioning System ("GPS") time is used as a universal reference for coordinated synchronized advertising run time. In this embodiment, the field represents the total number of seconds from the reference point of the number of seconds past midnight of Jan. 6, 1980, Greenwich Mean Time ("GMT"), the GPS epoch. The number of seconds here may be expressed as a 32 bit, or 4 byte, number.

The "Expiration Time" field provides the absolute stop time of the advertisement. It also represents the total number of seconds from the reference point of the number of seconds past midnight of Jan. 6, 1980, GMT, and the Expiration Time is also expressed as a 4 byte number. The Schedule Expiration Time is independent from the Advertisement Digest Expiration Time.

The "User Discard" field is a user interface parameter, and it concerns whether a user may discard or delete a particular advertisement. In this embodiment, if the User Discard value is set to "1" then the respective advertisement can be deleted by the user. If set to "0" then the user cannot delete this advertisement.

The "Audio Alert" field may serve as a flag for an audio alert upon the playing of the advertisement. If it is set to "1", then for example, a brief tonal alert may be played at the start of the advertisement. As well, the audio alert may be manufacturer specific, and it may follow the subscriber unit's current ringer settings. These may include normal ring, silent, or vibrate. In the case of a silent setting for the subscriber unit, the unit may play no tones at all, and in the case of a vibrate setting, the unit may vibrate instead of, or in addition to, playing a tonal alert.

The "Single Run" field provides a flag for indicating that an advertisement is to be run only once. In such a case, this bit may be set to "1". If this bit is set to 1, the "Run Times", "Day of Week", "Recurring Days", "Start Time of Day", and "Duration Time of Day" fields may be excluded, as they are irrelevant to a message shown only once. Depending on preference, these latter fields may also be included but ignored in putting together the schedule for a particular message or advertisement.

The "Run Times" field provides a count that represents the occurrence of the following four fields: Day of Week, Recurring Days, Start Time of Day, and Duration Time of Day. This count totals the number of times a message or advertisement is displayed, without regard to the length of time of the display. In this embodiment, this field is 5 bits long, allowing for the expression of up to 32 different run times for a particular advertisement. The Run Times field may be longer or shorter as desired.

The "Rotation Timer" field provides a timer that specifies the time in seconds that an advertisement will be displayed before "rotating" to another ad. In this embodiment, this field contains 6 bits, for expression of up to 64 time values for rotation. The preferred embodiment utilizes a range of timer values between 5 and 60 seconds, inclusive.

The "GMT Reference" field provides a bit that may be used to control synchronization of advertisements. Set to a "0", the "Start Time of Day" field times may be offset by the local time provided at the subscriber station. Set to a "1", the "Start Time of Day" field times may be used as an absolute reference from GMT. The "Reserved" bit may be populated with a "0" bit to make the length of the entire information element equal to an integer number of octets.

The "Day of Week" field may specify which day of the week a particular run time of a message or advertisement will execute. The field uses 3 bits for this purpose, allowing up to 8-day states. The field uses the day with the value of 0×111 as a special state, in which the schedule obeys the "Recurring Days" field. This special case, along with the other days of the week, are represented as noted below, in Table 3.

TABLE 3

| Value | Day |
| --- | --- |
| 000 | Sunday |
| 001 | Monday |
| 010 | Tuesday |
| 011 | Wednesday |
| 100 | Thursday |
| 101 | Friday |
| 110 | Saturday |
| 111 | Recurring Days |

The "Recurring Days" field may define which days of the week a recurring advertisement will play. This recurrence may correspond with the day of week field noted below in Table 4. A "1" represents a selection for that day, beginning with bit 0, the most significant bit, denoting Sunday, and continuing to bit 6, the least significant bit, denoting Saturday. In the preferred embodiment, this field is always present, and if the Day of Week field is not equal to "111", the Recurring Days field may be set to "0000000".

TABLE 4

| Bit | Day |
| --- | --- |
| 0 | Sunday |
| 1 | Monday |
| 2 | Tuesday |
| 3 | Wednesday |
| 4 | Thursday |
| 5 | Friday |
| 6 | Saturday |

The "Start Time of Day" field represents a count, in minutes after midnight, that the advertisement will begin to run. This field uses 11 bits, which theoretically allows for up to 2048 time units. In the preferred embodiment, though, the maximum count is 1439 minutes, corresponding to 23 hours and 59 minutes.

The "Duration Time of Day" field represents the number of minutes that a particular advertisement will run. This field also uses 11 bits, which theoretically allows for up to 2048 time units. In the preferred embodiment, though, the maximum count is 1439, corresponding to 23 hours and 59 minutes.

In the preferred embodiment, the schedule for the advertisement information elements may become rather complex. We will explore several examples to illustrate the function of the schedule. The compact format disclosed here may allow a greater amount of flexibility of scheduled run times, while still minimizing the number of SMS pages used to convey advertisements. Moreover, a more compact format may better utilize potentially limited subscriber station memory.

In a first example of the use of the schedule, the Control Instruction Information Elements field 212 of a Schedule control instruction may be comprised as shown in Table 5.

TABLE 5

| Field Name | Control Instruction Value |
| --- | --- |
| Information Element (0 × 01) | 0 × 01 |
| Ad ID | 0 × 00000001 |
| Start Time (GPS time, Dec. 23, 2001) | 693100800 (dec) |
| Expiration Time (GPS time, Dec. 29, 2001) | 693619200 (dec) |
| User Discard | "0" |
| Audio Alert | "1" |
| Single Run | "0" |
| Run Times (4 run times) | "00100" |
| Rotation Timer (30 seconds) | "011110" |
| GMT Reference | "0" |
| Reserved | "0" |
| Day of Week (Sunday) | "000" |
| Recurring Days | "0000000" |
| Start Time of Day (12:00) | "01011010000" |
| Duration Time of Day (60 minutes) | "00000111100" |
| Day of Week (Sunday) | "000" |
| Recurring Days | "0000000" |
| Start Time of Day (17:00) | "01111111100" |
| Duration Time of Day (120 minutes) | "00001111000" |
| Day of Week (Tuesday) | "010" |
| Recurring Days | "0000000" |

TABLE 5-continued

| Field Name | Control Instruction Value |
|---|---|
| Start Time of Day (9:00) | "01000011100" |
| Duration Time of Day (120 minutes) | "00001111000" |
| Day of Week (Friday) | "101" |
| Recurring Days | "0000000" |
| Start Time of Day (11:00) | "01010010100" |
| Duration Time of Day (420 minutes) | "00110100100" |

In this schedule, we note that the Start Time is 693100800 seconds after the GPS epoch. In the actual control instruction, of course, this value is expressed in binary numbers and not decimal numbers, which are shown here for ease of understanding. Similarly, the Expiration Time is displayed in decimal value as 693619200 seconds after the GPS epoch. Therefore, the advertisement corresponding to this schedule will begin its display schedule Sunday, Dec. 23, 2001, and end its display schedule Saturday, Dec. 29, 2001.

The User Discard flag is set to "0", so the user will be unable to discard the particular advertisement corresponding to this schedule. The Audio Alert flag is set to "1", though, so an alert will be given, according to the settings of the subscriber station, when the advertisement is displayed. The Single Run flag is set to "0", so this advertisement will not be limited to a single display, and therefore, the Run Times, Day of Week, Recurring Days, Start Time of Day, and Duration Time of Day may be utilized.

The Run Times field has a value of 4, so there should be 4 distinct run time settings for the advertisement. The Rotation Timer field bears a value of 30, and so the advertisement may be displayed for 30 seconds before rotating to another advertisement. The GMT Reference bit is set to "0", so the advertisement start time may be offset by the local time.

The Day of Week Field has a value "000", corresponding to Sunday, as noted in Table 3. Since the Day of Week field was not set to "111"—which would have indicated that the Recurring Days field was in use—the Recurring Days field is set to "0000000". The Start Time of Day is set to "01011010000", which corresponds to 720 in decimal values, so the start time for the advertisement is 720 minutes after midnight, or 12:00 PM. The Duration Time of Day value is "00000111100", or 60 in decimal values, corresponding to a duration of 60 minutes for this display period of the advertisement.

This process of determining a Day of Week, Recurring Days, Start Time of Day, and Duration Time of Day is repeated three more times for this particular schedule. These values correspond to advertisement run times of Sunday, 5PM to 7PM; Tuesday, 9AM to 11AM; and Friday, 11AM to 6PM. A block diagram of the schedule for display of this advertisement may be found in FIG. 4.

In a second example of the use of the schedule, the Control Instruction Information Elements field 212 of a Schedule control instruction may be comprised as shown in Table 6.

TABLE 6

| Field Name | Control Instruction Value |
|---|---|
| Information Element (0 × 01) | 0 × 01 |
| Ad ID | 0 × 00000001 |
| Start Time (GPS time, Dec. 23, 2001) | 693100800 (dec) |

TABLE 6-continued

| Field Name | Control Instruction Value |
|---|---|
| Expiration Time (GPS time, Dec. 29, 2001) | 693619200 (dec) |
| User Discard | "0" |
| Audio Alert | "1" |
| Single Run | "0" |
| Run Times (1 run times) | "1" |
| Rotation Timer (30 seconds) | "011110" |
| GMT Reference | "0" |
| Reserved | "0" |
| Day of Week (Recurring) | "111" |
| Recurring Days | "0111110" |
| Start Time of Day (5:00) | "00100101100" |
| Duration Time of Day (60 minutes) | "00000111100" |

In this schedule, we note that the Start Time is again 693100800 seconds after the GPS epoch, and the Expiration Time is 693619200 seconds after the GPS epoch. Therefore, the advertisement corresponding to this schedule will begin its display schedule Sunday, Dec. 23, 2001 and end its display schedule Saturday, Dec. 29, 2001.

The User Discard flag is set to "0", so the user will be unable to discard the particular advertisement corresponding to this schedule. The Audio Alert flag is set to "1", though, so an alert will be given, according to the settings of the subscriber station, when the advertisement is displayed. The Single Run flag is set to "0", so this advertisement will not be limited to a single display, and therefore, the Run Times, Day of Week, Recurring Days, Start Time of Day, and Duration Time of Day may be utilized.

The Run Times field has a value of 1, so there should be 1 distinct run time setting for this advertisement. In this particular example, though the advertisement is displayed on multiple days, this schedule utilizes the recurring days functionality. Therefore, these multiple displays may be expressed through a single Day of Week, Recurring Days, Start Time of Day, and Duration Time of Day group of values, as opposed to the 4 groups used in the previous example.

Next, the Rotation Timer field bears a value of 30, and so the advertisement may be displayed for 30 seconds before rotating to another advertisement. The GMT Reference bit is set to "0", so the advertisement start time may be offset by the local time.

The Day of Week field has a value "111", corresponding to the special recurring functionality of the schedule, as noted in Table 3. Since the Day of Week field was set to "111"—which indicates that the Recurring Days field is in use—we will look to that field to determine on which days the advertisement will play. Here, the Recurring Days field has a value of "0111110", and we note that the 1 through 5 bits are set, corresponding to display days of Monday through Friday, as indicated by Table 4.

The Start Time of Day is set to "00100101100", which corresponds to 300 in decimal values, so the start time for the advertisement is 300 minutes after midnight, or 5:00 AM. The Duration Time of Day value is "00000111100", or 60 in decimal values, corresponding to a duration of 60 minutes for this display period of the advertisement. A block diagram of the schedule for display of this advertisement may be found in FIG. 5.

In a third example of the use of the schedule, the Control Instruction Information Elements field 214 of a Schedule control instruction may be comprised as shown in Table 7.

TABLE 7

| Field Name | Control Instruction Value |
|---|---|
| Information Element (0 × 01) | 0 × 01 |
| Ad ID | 0 × 00000001 |
| Start Time (GPS time, Dec. 23, 2001) | 693100800 (dec) |
| Expiration Time (GPS time, Dec. 29, 2001) | 693619200 (dec) |
| User Discard | "1" |
| Audio Alert | "1" |
| Single Run | "0" |
| Run Times (9 run times) | "01001" |
| Rotation Timer (30 seconds) | "011110" |
| GMT Reference | "0" |
| Reserved | "0" |
| Day of Week (Sunday) | "000" |
| Recurring Days | "0000000" |
| Start Time of Day (12:00) | "01011010000" |
| Duration Time of Day (60 minutes) | "00000111100" |
| Day of Week (Sunday) | "000" |
| Recurring Days | "0000000" |
| Start Time of Day (17:00) | "01111111100" |
| Duration Time of Day (120 minutes) | "00001111000" |
| Day of Week (Tuesday) | "010" |
| Recurring Days | "0000000" |
| Start Time of Day (9:00) | "01000011100" |
| Duration Time of Day (120 minutes) | "00001111000" |
| Day of Week (Wednesday) | "011" |
| Recurring Days | "0000000" |
| Start Time of Day (9:00) | "01000011100" |
| Duration Time of Day (60 minutes) | "00000111100" |
| Day of Week (Wednesday) | "011" |
| Recurring Days | "0000000" |
| Start Time of Day (17:00) | "01111111100" |
| Duration Time of Day (60 minutes) | "00000111100" |
| Day of Week (Friday) | "101" |
| Recurring Days | "0000000" |
| Start Time of Day (11:00) | "01010010100" |
| Duration Time of Day (420 minutes) | "00110100100" |
| Day of Week (Saturday) | "110" |
| Recurring Days | "0000000" |
| Start Time of Day (11:00) | "01010010100" |
| Duration Time of Day (180 minutes) | "00010110100" |
| Day of Week (Recurring) | "111" |
| Recurring Days | "0111110" |
| Start Time of Day (5:00) | "00100101100" |
| Duration Time of Day (60 minutes) | "00000111100" |
| Day of Week (Recurring) | "111" |
| Recurring Days | "1101110" |
| Start Time of Day (22:00) | "10100101000" |
| Duration Time of Day (60 minutes) | "00000111100" |

In this example, unlike the first two, we note that the User Discard field is set to "1", which will allow the user to delete this particular advertisement, if he desires to do so. Activating this deletion option may cause the particular advertisement to be removed from the memory of the subscriber station or deactivate the advertisement by, for example, causing a pointer to the advertisement to be moved to another advertisement or a default or null state. In this example, as shown in the Run Times field, there are 9 distinct run time settings for this advertisement. This third example also mixes the recurring day display functionality with the single day display functionality, with 2 recurring time displays and 7 single time displays.

Figure 6:
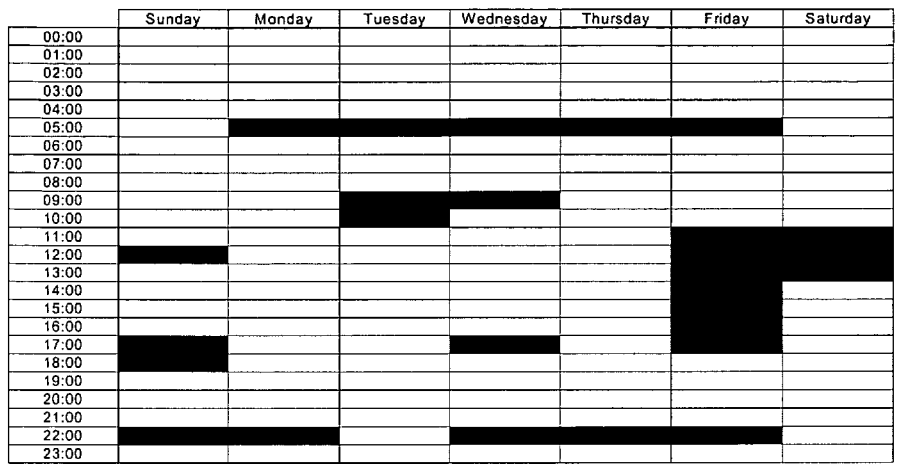
FIG. 6 is a block diagram of a sample time-based schedule mixing single and recurring display periods, in accordance with the exemplary embodiment.

The first 7 displays are single time schedule displays: Sunday, 12PM to 1PM; Sunday, 5PM to 7PM; Tuesday, 9AM to 11AM; Wednesday, 9AM to 10AM; Wednesday, 5PM to 6PM; Friday, 11AM to 6PM; and Saturday, 11AM to 2PM. The final 2 displays are recurring time schedule displays: Monday through Friday, 5AM to 6AM, and Sunday, Monday, Wednesday, Thursday, and Friday, 10PM to 11PM. A block diagram of the schedule for display of this advertisement may be found in FIG. 6.

Next, in the "Advertisement Digest" control instruction—Control Instruction Type 0×02—the Control Instruction Information Elements field 212 may contain the message or advertisement that is to be displayed on the subscriber unit. The advertisement digest is preferably in Handheld Device Markup Language ("HDML")/Wireless Markup Language ("WML") digest format. Similarly, the advertisement digest may comprise a deck of WML cards and/or images, as is known in the art. A preferred structure of the advertisement digest control instruction is outlined below, in Table 8.

TABLE 8

| Field Name | Size (in Bits) |
|---|---|
| Ad ID | 32 |
| Expiration Date | 32 |
| Category ((12 7-bit ASCII characters) + _4 bits) | 88 |
| Title ((12 7-bit ASCII characters) + 4 bits) | 88 |
| Reserved | 8 |
| Digest Size | 16 |
| Digest Contents | Variable |

The "Ad ID" field serves as an identifier for the advertisement. This parameter may be referenced when canceling an advertisement and also by the schedule. As noted earlier, in the preferred embodiment, the Ad ID is a 32 bit, or 4 byte, field. Such a large number of bits may allow an almost unlimited number of ads to be identified for use at the subscriber station.

The "Expiration Date" field provides an absolute stop time for the advertisement. GPS time is used as a universal reference for coordinated synchronized advertising run time. The Expiration Date field represents the total number of seconds from the reference point of the number of seconds past midnight of Jan. 6, 1980, GMT, the GPS epoch. As mentioned earlier, the Advertisement Digest Expiration Time is independent from the Schedule Expiration Time.

The "Category" field defines the category of the advertisement. This is a parameter related to the user interface. This field preferably uses 88 bits, which may include 12 7-bit ASCII characters. As well, 4"0" bits are added to the end of the field to keep it byte-aligned. Additionally, the "Title" field defines the title of the advertisement, and that field uses 88 bits configured similarly to the Category field. The "Reserved" field comprises 8 bits, or 1 byte, and preferably, this field may be expanded to 32 bits if the leading bit is set to "1".

The "Digest Size" field represents the number of bytes that are contained within the HMDL/WML digest. This field preferably uses 16 bits, or 2 bytes, to express this number, and such a large number of bits may express a number of bytes of up to 65,536 in an Advertisement Digest control instruction. The "Digest Contents" field includes the contents of the actual advertisement in HDML/WML digest format. This field may be of variable length, owing to the non-uniform nature of HDML/WML digests.

Next, in the "Cancel Particular Schedule" type control instruction-Control Instruction Type 0×04—the Control Instruction Information Elements field 212 may contain the Ad ID of a schedule that is to be cancelled on the subscriber unit. The field of this control instruction type is shown in Table 9.

TABLE 9

| Field Name | Size (in Bits) |
| --- | --- |
| Ad ID | 32 |

Optionally, an additional flag may be provided to denote that all schedules should be cancelled. Or, a particular Ad ID may be reserved to denote all schedules, such that all schedules may be cancelled without the use of an additional flag bit.

When a schedule is cancelled, it is preferably deleted from the memory of the subscriber station. Even so, this deletion may also allow the schedule to remain in memory but be deactivated by, for example, redirecting a pointer to the schedule to another schedule or a null state. In the current embodiment, the advertisement message is not affected by the cancellation of its schedule, but if desired, an alternate embodiment may provide for the deletion of the message at the deletion of the schedule.

The "Cancel Particular Advertisement" type control instruction—Control Instruction Type 0x0A—provides that the Control Instruction Information Elements field 212 may contain the Ad ID of an advertisement that is to be cancelled on the subscriber unit. This control instruction may act similarly to the Cancel Particular Schedule control instruction in deleting the advertisement by removing the cancelled advertisement from the memory of the subscriber station or deactivating it in the manner described above. Further, the schedule is unaffected by the cancellation of the advertisement in the preferred embodiment, but it may also be deleted in an alternate embodiment. The field of this control instruction type is shown in Table 10.

TABLE 10

| Field Name | Size (in Bits) |
| --- | --- |
| Ad ID | 32 |

Further, if the subscriber station is sent the "Cancel All Advertisement" type control instruction—Control Instruction Type 0x0B—all advertisement may be cancelled in the subscriber station. This cancellation may be performed in a similar manner as the cancellation of a particular advertisement, as noted above.

If an "Advertising Statistics Request" type control instruction—Control Instruction Type 0x10—is sent, the transfer of Advertising Statistics may be initiated between the subscriber station and a remote server. This preferably results in an Advertising Statistics Upload control instruction being sent from the subscriber station to the remote server. The contents of the Control Instruction Information Elements field 212 for the Advertising Statistics Request control instruction are preferably provided in Table 11.

TABLE 11

| Field Name | Size (in Bits) |
| --- | --- |
| QNC Dial String | 70 |
| Destination IP Address | 32 |
| Destination Port | 16 |

The "QNC Dial String" field represents a dial string the subscriber unit may use to establish a Quick Net Connection ("QNC"). QNC is a 3Com proprietary implementation of circuit switched data technology and is based on standards document "Data Service Options for Spread Spectrum Systems: Introduction and Service Guide," TIA/EIA/IS-707-A.1 (PN-4145.1), March 1999 (hereinafter referred to as "IS-707A"). IS-707A is hereby fully incorporated by reference.

The size of this field is 70 bits, which may be broken down into 10 7-bit character fields. The first non "0" character preferably represents the beginning of the dial string. For example, the dial string "000000#777" may be interpreted as "#777".

The "Destination IP Address" field represents the Internet Protocol ("IP") address of the remote server that is to receive the Advertising Statistics Upload control instruction. The field may be 32 bits, or 4 bytes, long, corresponding to a traditional IP version 4 ("IPv4") address. This field may be modified as necessary to allow compatibility with later versions of IP or other network addressing systems.

The "Destination Port" field represents the port on the remote server that is to receive the Advertising Statistics Upload control instruction. This field is 16 bits, or 2 bytes, long, allowing for up to 65,536 different port denotations.

The Advertisement Statistics Upload control instruction may be sent to the remote server as one or more User Datagram Protocol ("UDP") datagrams via the QNC connection. The QNC Dial String, Destination IP Address, and Destination Port may be ascertained from the Advertisement Statistics Request control instruction. The format of the Advertisement Statistics Upload control instruction is preferably as shown in Table 12.

TABLE 12

| Field Name | Size (in bits) |
| --- | --- |
| Advertisement Statistics Indicator | 21 |
| MIN | 70 |
| Ad ID Count | 16 |
| Advertisement Statistics Set | Variable |
| Reserved | 0–7 |

The "Advertisement Statistics Indicator" field may serve as an identifier for the remote server. This field may contain 21 bits, arranged as a 3 7-bit character field. It is preferably set to the text string, "ASI". The "MIN" field represents the subscriber unit Mobile Identification Number ("MIN"). The MIN field may utilize 70 bits, organized as 10 7-bit characters.

The "Ad ID Count" field represents the number of Advertisement Statistics Set occurrences. This field preferably has capacity to show 16 bits, or 2 bytes, worth of occurrences. The "Advertisement Statistic Set" field represents a set of advertising statistics for an individual Advertisement. These advertising statistics are represented as shown in Table 13.

TABLE 13

| Field Name | Size (in bits) |
| --- | --- |
| Ad ID | 32 |
| Clickthroughs | 8 |
| Call Link Hits | 8 |
| Web Link Hits | 8 |

The "Ad ID" field serves as an identifier for a particular advertisement, as noted earlier. The "Clickthroughs" field represents the number of Clickthroughs for the advertisement. Clickthroughs may be defined as the number of times the user clicked on any particular page of the advertisement. This field may contain 8 bits, or 1 byte, which allows up to 255 Clickthroughs to be recorded for each advertisement.

The "Call Link Hits" field represents the number of times the user originated a voice call from a voice call link within the advertisement. This field also may contain 8 bits, or 1 byte, allowing for up to 255 Call Link Hits to be recorded for each advertisement. The "Web Link Hits" field represents the number of times the user established a Web connection from an embedded Web link within the advertisement. The Web Link Hits field may similarly contain 8 bits.

At the end of the Advertisement Statistics Upload control instruction, a Reserved field may be populated with up to 7"0" bits in order to make the length of the entire information element equal to an integer number of octets.

A control instruction under the preferred embodiment may be conveyed as an SMS message, a series of SMS messages, or any other type of message. Often, a series of SMS messages may be used to convey a control instruction that is too long to be conveyed in a single SMS message. In such a case, one may use a message number and a segment number to assist in breaking apart and reassembling the long control instruction. In this way, several SMS messages may express the content of a single control instruction.

Figure 7:
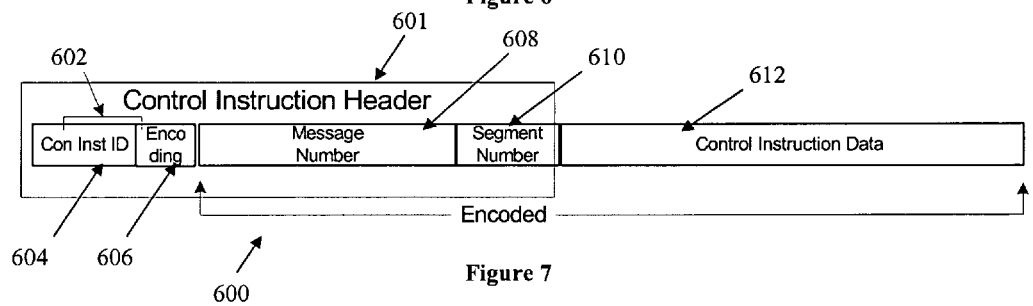
FIG. 7 is a block diagram of a Short Message Service message conveying one segment of a control instruction, in accordance with the exemplary embodiment.

Such an SMS message 600 may be expressed as in FIG. 7. The SMS message 600 contains a header 601 and a control instruction data field 612. The header 601 includes a preamble 602, which includes a control instruction identifier 604 and an encoding identifier 606. The preamble 602 may be used to identify this SMS message 600 as a control instruction segment. Because of network constraints, it may be desirable to compose the preamble 602 of the SMS message 600 using visible ASCII characters.

The control instruction identifier 604 may be needed to distinguish this SMS message 600 from a "conventional" text-only SMS data field. The identifier 604 is preferably 3 bytes long and may preferably be the characters "/S5", which is not a likely sequence of initial characters to be sent in a "standard" SMS message body.

The encoding identifier 606 may identify the type of encoding that is employed over the remainder of the control instruction segment (e.g. everything following the preamble). Depending on the characteristics of the network that is delivering the message, special encoding may be required in order to ensure that no data is lost by the network (e.g. some networks will strip out non-visible ASCII data). Some potential values for this field may be found in Table 14.

TABLE 14

| Identifier | Encoding Scheme |
| --- | --- |
| 'n' | No encoding (binary data) |
| 'b' | Base64 encoding |
| Other values | Reserved |

The message number field 608 may be needed in order for the subscriber station to reassemble segmented control instructions. Since the application originating the control instruction may not be sophisticated enough to keep track of separate SMS message number sequences for individual devices, this field is preferably large enough to reasonably ensure that a message number is not duplicated in two SMS messages sent to the same device within a brief window of time.

When generating a message number, the originating application may use a pseudo-random number generator to choose a 2-byte number. In addition, subscriber stations may attempt to reduce the probability of false matches by enforcing a reasonable proximity of timestamp values for a given SMS message. The specific window of time to be used may differ from manufacturer to manufacturer for a particular subscriber station.

As an additional protection against false message number matches, subscriber units may optionally discard all SMS message segments for a given message number whenever it receives two SMS messages with identical message numbers and identical segment numbers. Even so, it may be undesirable to do this in the case of duplicate SMS message deliveries due to missed acknowledgements at the lower layers.

The segment number field 610 allows for the reconstruction of a long control instruction that has been segmented into multiple SMS messages. Data segments should preferably be reconstructed sequentially starting from segment 0. In this embodiment, the total number of segments in a control instruction is not explicitly communicated, but the receiving side may know when it has received a complete control instruction by referencing the control instruction size field 206 of the assembled control instruction. In the segment number field 610, the most significant bit may be reserved as an extended-length indicator, meaning that up to 127 segments may be sent using the 1-byte field.

The control instruction data field 612—when concatenated with data fields from the other segments of the same message number—should comprise a control instruction as discussed above with regard to FIG. 3. The final assembly of a two-segment control instruction may be seen in FIG. 8.

Figure 8:
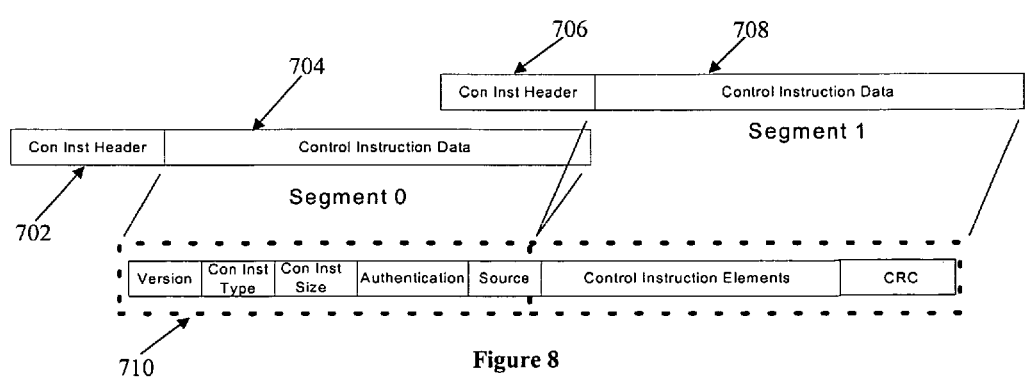
FIG. 8 is a block diagram of two Short Message Service message segments forming a single control instruction, in accordance with the exemplary embodiment.

In FIG. 8, the control instruction data field 704 of SMS message 702 stores the data of Segment 0, and the data field 708 of SMS message 706 stores the data of Segment 1. These two data fields 704, 708 may be combined by the receiving subscriber station to form a control instruction 710. This control instruction 710 has a similar structure to the control instruction described in FIG. 3 earlier.

Figure 9:
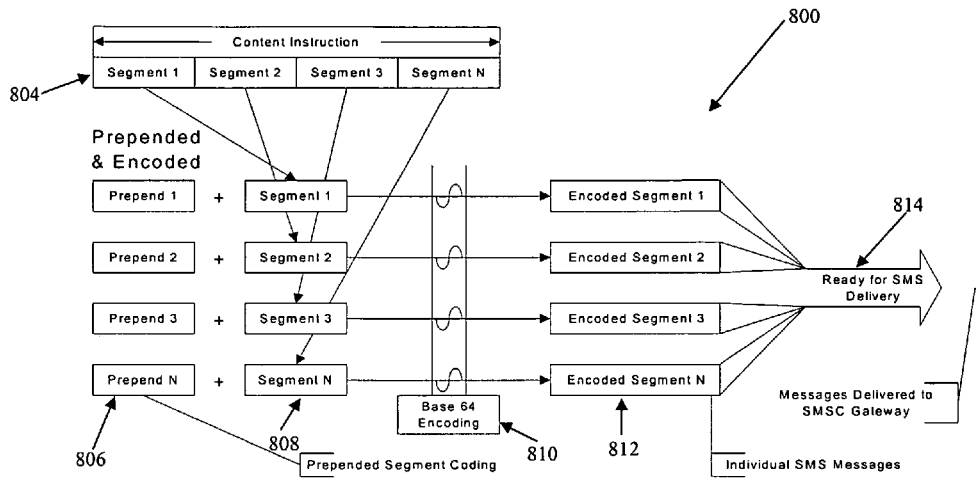
FIG. 9 is a functional block diagram of the segmentation, sending, and reassembly of a control instruction using Short Message Service messages, in accordance with the exemplary embodiment.
Figure 9:
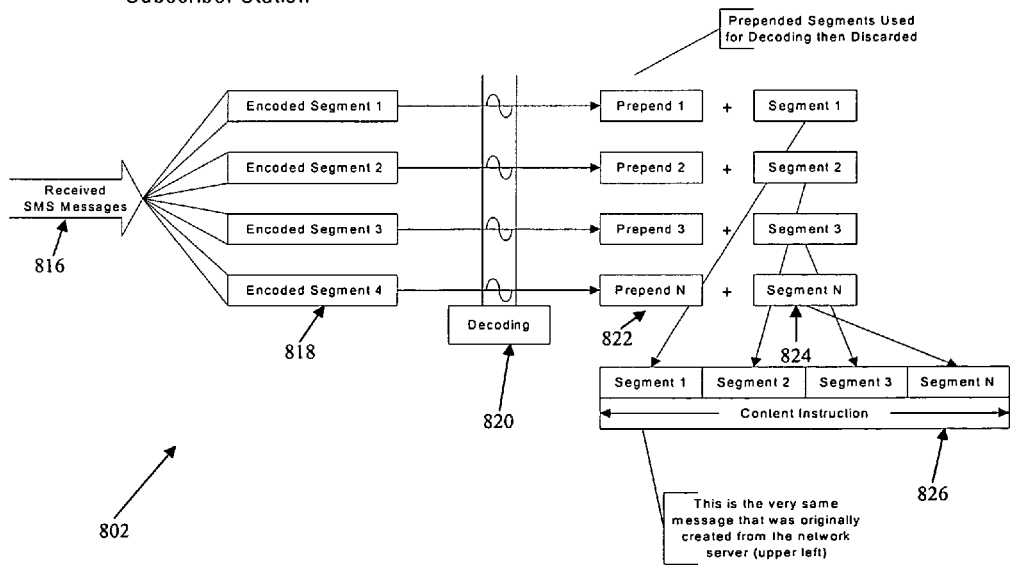

FIG. 9 shows the process of segmentation and reassembly of a control instruction from a remote network device 800 to a subscriber station 802. First, beginning with a control instruction 804, several segments 808 (1 through N) are formed. These segments 808 are combined with prepended headers 806. These headers 806 correspond to the header 601 of FIG. 7. Next, the SMS messages are encoded 810, in accordance with the encoding identifier 606—here, Base 64 encoding. After encoding, the encoded SMS message segments 812 are delivered 814. The SMS segments 812 are received at the subscriber station at 816, and they are stored at the subscriber station at 818. The segments 818 are then decoded 820, and separated into their component parts—prepended headers 822 and segments 824. The control instruction 826 is then reassembled and stored in the subscriber station 802.

Figure 10:
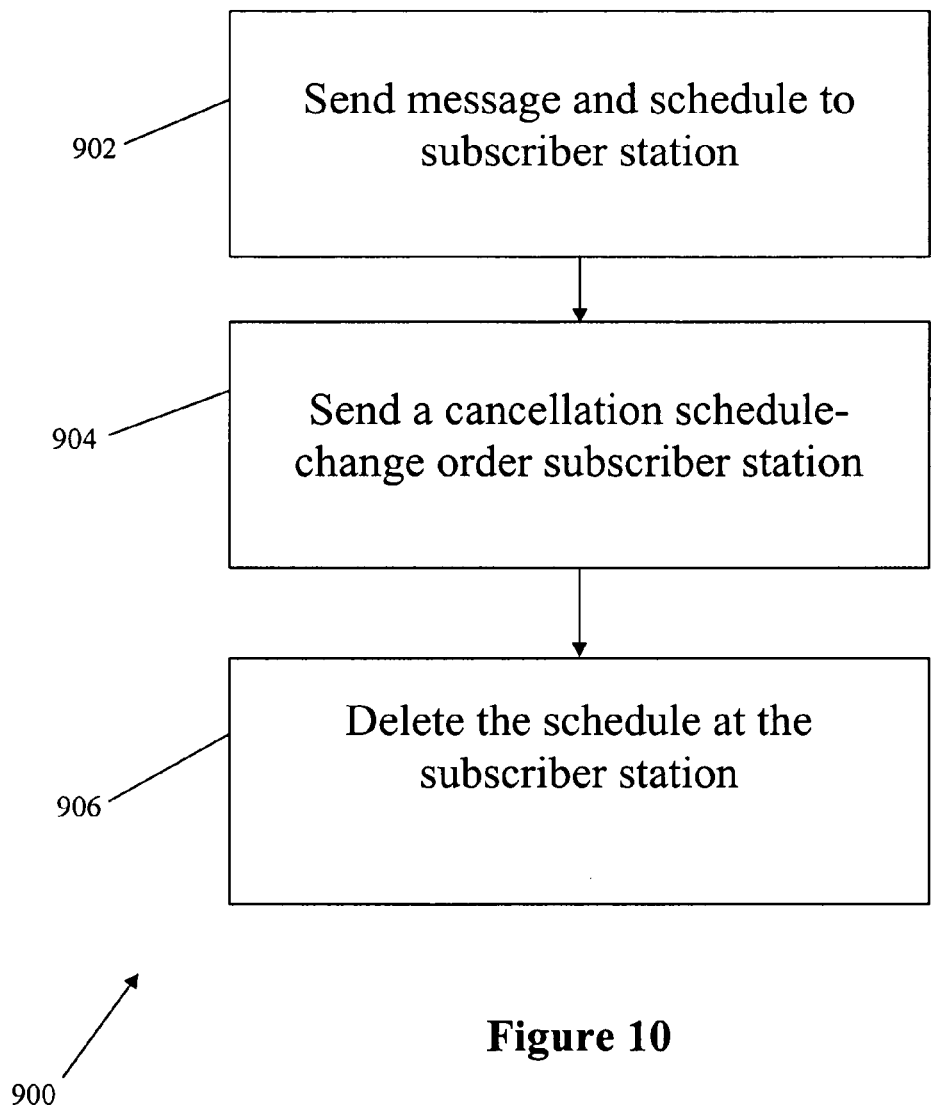
FIG. 10 is a simplified flow diagram illustrating the process of deleting a schedule at a subscriber station, in accordance with the exemplary embodiment.

Turning now to FIG. 10, that figure discloses a method 900 for substituting a schedule in a subscriber station. In step 902, a message and schedule for presentation of the message is sent to the subscriber station. In the embodiments described herein, the message and the schedule may be conveyed in control instructions. These control instructions are preferably an Advertisement Digest type control instruction containing an advertisement message and a Schedule type control instruction containing schedule information.

Each of these control instruction may be conveyed as an individual SMS message, a series of SMS messages, or other type of message.

In step 904, a cancellation schedule-change order is sent to the subscriber station. This cancellation schedule-order may preferably be a Cancel Particular Schedule type control instruction. Then, in step 906, the schedule at the subscriber station is deleted. This deletion may take the forms noted in the Cancel Particular Schedule and Cancel Particular Advertisement type control instructions.

Figure 11:
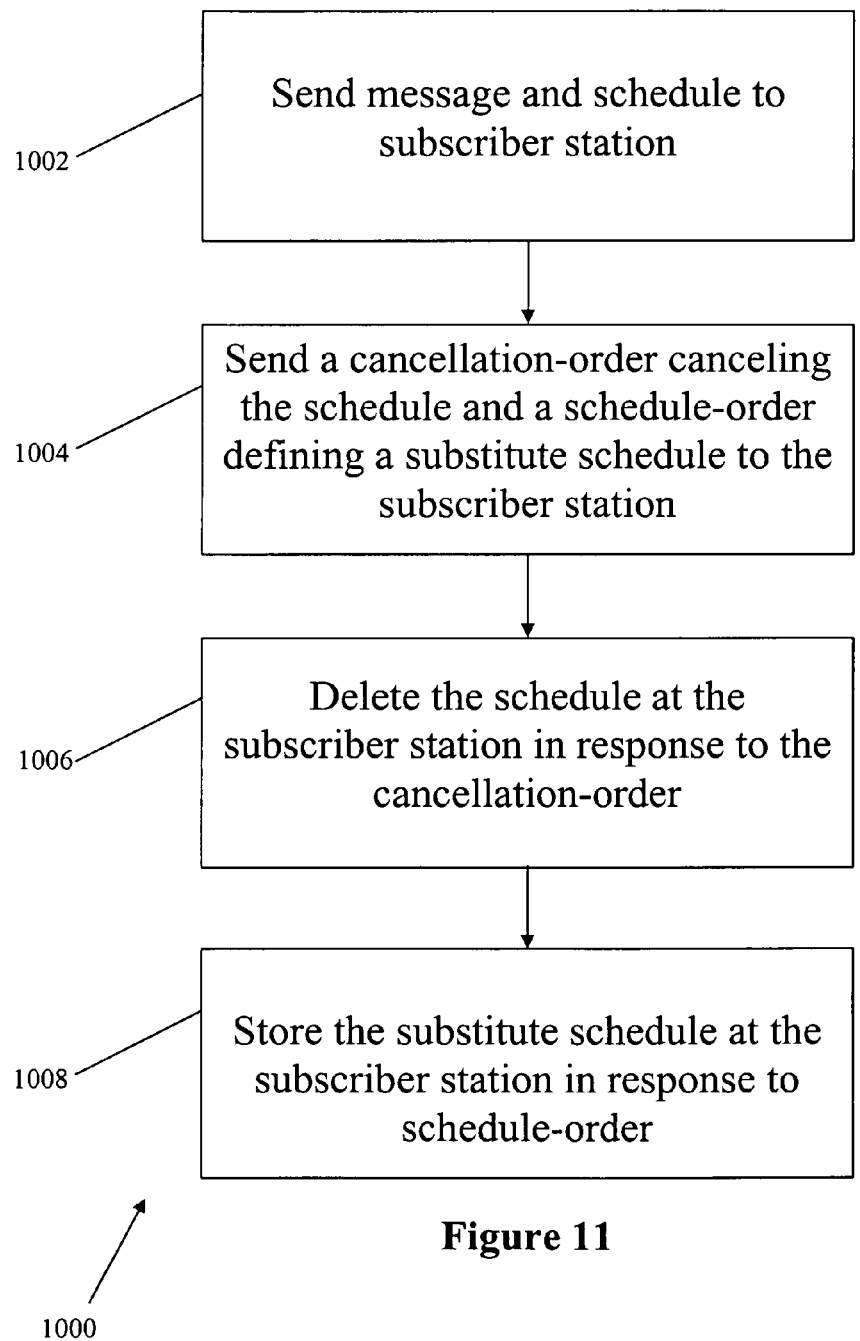
FIG. 11 is a simplified flow diagram illustrating the process of deleting a schedule and storing a substitute schedule at a subscriber station, in accordance with the exemplary embodiment.

Turning to FIG. 11, that figure discloses a method 1000 for replacing an existing schedule with a substitute schedule. In step 1002, a message and schedule are sent to a subscriber station. In step 1004, a cancellation-order for canceling the schedule and a schedule-order for defining a substitute schedule are sent to the subscriber station. In response to the cancellation-order the schedule is deleted at the subscriber station in step 1006. Responsive to the schedule-order, in step 1008, the substitute schedule is stored in the subscriber station. The substitute schedule may be associated with the message by, for example, the management-program 116 of FIG. 2, and the substitute schedule may be presented by, for example, using the presentation-program 114 of FIG. 2.

Figure 12:
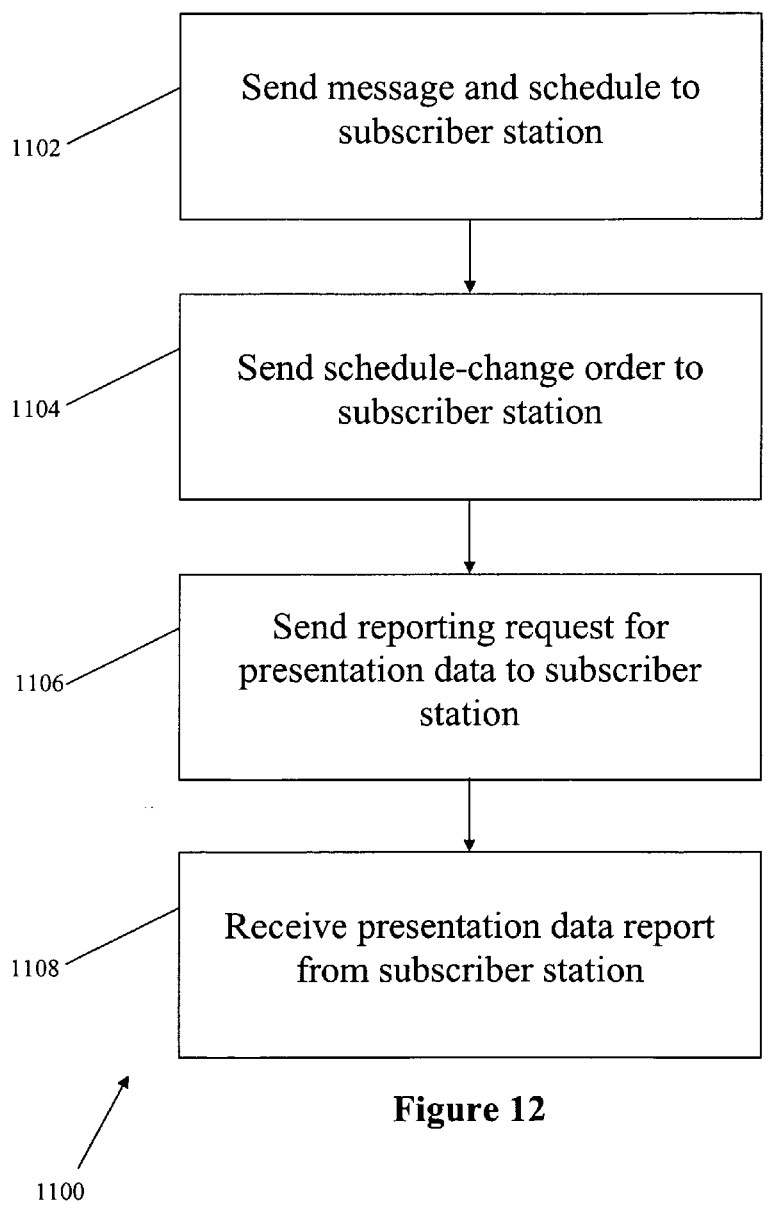
FIG. 12 is a simplified flow diagram illustrating the process of sending a request for presentation data and receiving a presentation data report from a subscriber station, in accordance with the exemplary embodiment.

FIG. 12 exhibits a method 1100 for requesting and receiving presentation data from the subscriber station. In step 1102, a message and schedule for presentation of the message are sent to the subscriber station. Step 1104 provides a schedule-change order to be sent to the subscriber station. This schedule change order may include the earlier-mentioned message or schedule cancellation orders, a substitute schedule order, a scheduling parameter, or other schedule information.

Scheduling parameters may include particulars of the presentation of the message like those noted, for example, in Table 2, related to the schedule type control instruction. A date/time scheduling parameter may denote a specific date (e.g., Jun. 21, 2001), a specific time (e.g., 1:00 PM), a relational date (e.g., third Tuesday of each month), other known date or time identifiers, or some combination of these (e.g., show the message at 1:00 PM, the third Tuesday of each month after Jun. 21, 2001). This parameter may denote a date/time for presentation of a message, to start presentation of a message, to stop presentation of a message, or other desired presentation characteristic.

The scheduling parameters may also include a duration for presentation of a message (e.g., 60 seconds, 15 minutes, 2 hours)—this duration may be specific to a particular date/time for presentation or may be general for all displays of a particular message. Another parameter may comprise a number of times to present the message. Such a criterion may be an absolute number of times before deleting a message, a number of times to present a message within a particular date/time for presentation, a number of times to present a message in a particular week, or over another desirable period.

The parameters may also include a frequency of presentation of the message, which may have a similar function to the rotation timer control instruction of the preferred embodiment. The frequency may be expressed as, for example, a number of seconds to display the message before rotating to another message or before rotating to a blank page or a default state.

In step 1106, a reporting request for presentation data is sent to the subscriber station, and in step 1108, the presentation data report is received from the subscriber station. The presentation data may be connected to a particular message, a series of messages, all messages generally, or any other desired event. The above-mentioned advertising statistics upload message provides several examples of statistics that may be provided in response to a request for presentation data.

It should be understood that the programs, processes, methods, systems and apparatus described herein are not related or limited to any particular type of computer apparatus (hardware or software), unless indicated otherwise. Various types of general purpose or specialized computer apparatus may be used along with the present invention or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, method steps may be taken in sequences other than those described, and more or fewer elements or components may be used in the implementation of the invention.

In addition, the present invention can be practiced with software, firmware, hardware, or a combination thereof. Furthermore, all embodiments that come within the scope and spirit of this specification and equivalents thereto are claimed as the invention.

What is claimed is:

1. A method of managing message-presentation in a subscriber station, the method comprising:
   dividing a control instruction into a plurality of segments, the control instruction containing a time-based schedule for presentation of a presentable message;
   producing a plurality of Short Message Service (SMS) messages by a process comprising, for each segment, encoding each segment so as to produce a respective SMS message; and
   sending to the subscriber station, via a communications network, (i) the presentable message, and (ii) the plurality of SMS messages so as to allow the subscriber station to recover the plurality of segments and reassemble the plurality of segments into the control instruction, and so as to allow the subscriber station to then responsively present the presentable message according to the time-based schedule contained within the control instruction,
   wherein the schedule includes a start-time value that indicates when to start presentation of the presentable message.

2. The method of claim 1, wherein the presentable message comprises an advertisement.

3. The method of claim 1,
   wherein the time-based schedule includes user-discard data indicating whether a user of the subscriber station may discard the presentable message, and
   wherein discarding the presentable message is carried out by a function selected from the group consisting of: (i) removing the presentable message from a memory device of the subscriber station, and (ii) causing a pointer to the presentable message to be moved to another location.

4. A method of managing message-presentation in a subscriber station, the method comprising:
   dividing a first control instruction into a first plurality of segments, wherein the first control instruction includes a time-based schedule for presenting a presentable message;
   producing a first plurality of Short Message Service (SMS) messages by a process comprising, for each segment of the first plurality of segments, encoding the segment so as to produce a respective SMS message of the first plurality of SMS messages;

sending to the subscriber station, via a communications network, (i) the presentable message, and (ii) the first plurality of SMS messages so as to allow the subscriber station to recover the first plurality of segments and reassemble the first plurality of segments into the first control instruction, and so as to allow the subscriber station to then responsively present the presentable message according to the time-based schedule; and thereafter dividing a second control instruction into a second plurality of segments, wherein the second control instruction includes a schedule-change order defining a change to the time-based schedule for presentation of the presentable message;

producing a second plurality of SMS messages by a process comprising, for each segment of the second plurality of segments, encoding each segment so as to produce a respective SMS message of the second plurality of SMS messages;

sending to the subscriber station, via the communications network, the second plurality of SMS messages so as to allow the subscriber station to recover the second plurality of segments and reassemble the second plurality of segments into the second control instruction, and so as to allow the subscriber station to then responsively change the time-based schedule according to the defined change.

5. The method of claim 4, wherein the presentable message comprises an advertisement.

6. The method of claim 4, wherein the change to the time-based schedule comprises cancellation of the time-based schedule.

7. The method of claim 6, further comprising the subscriber station responding to the schedule-change order by deleting the time-based schedule.

8. The method of claim 4, wherein the schedule-change order includes a substitute-schedule, and wherein the change to the time-based schedule comprises replacement of the time-based schedule with the substitute-schedule.

9. The method of claim 8, further comprising the subscriber station responding to the schedule-change order by deleting the time-based schedule and storing the substitute-schedule, whereby the subscriber station is then programmed to present the presentable message according to the substitute-schedule.

10. The method of claim 8, wherein the schedule-change order comprises (i) a cancellation-order defining an instruction to cancel the time-based schedule and (ii) and a schedule-order defining the substitute-schedule.

11. The method of claim 10, further comprising:

the subscriber station responding to the cancellation-order by deleting the time-based schedule; and the subscriber station responding to the schedule-order by storing the substitute-schedule, whereby the subscriber station is then programmed to present the presentable message according to the substitute schedule.

12. The method of claim 4, wherein time-based the schedule defines a scheduling parameter, and the change to the time-based schedule comprises a change to the scheduling parameter.

13. The method of claim 12, wherein the scheduling parameter comprises a date/time for presentation of the presentable message.

14. The method of claim 12, wherein the scheduling parameter comprises a date/time to start presentation of the presentable message.

15. The method of claim 12, wherein the scheduling parameter comprises a date/time to stop presentation of the presentable message.

16. The method of claim 12, wherein the scheduling parameter comprises a duration for presentation of the presentable message.

17. The method of claim 12, wherein the scheduling parameter comprises a number of times to present the presentable message.

18. The method of claim 12, wherein the scheduling parameter comprises a frequency of presentation of the presentable message.

19. The method of claim 4, wherein the communications network comprises an air interface communicatively coupling the subscriber station with a base station.

20. The method of claim 4, further comprising:

sending to the subscriber station, via the communications network, a reporting request defining a request for data concerning presentation of at least one message; and receiving from the subscriber station a report defining data concerning presentation of the at least one message.

21. The method of claim 20, wherein the reporting request defines a network address to which the subscriber station should send the report, and wherein receiving the report comprises receiving the report at the network address.

22. The method of claim 4, wherein encoding each segment of the first plurality of segments and encoding each segment of the second plurality of segments is carried out using a Base 64 encoding scheme.

23. A method for managing message-presentation in a subscriber station, the method comprising:

receiving into the subscriber station, from a communications network, a presentable message and a first plurality of Short Message Service (SMS) messages, wherein each SMS message of the first plurality of SMS messages includes a respective segment of a plurality of segments of a first control instruction, and wherein the first control instruction contains a schedule for presentation of the presentable message;

recovering, from the first plurality of SMS messages, each segment of the first control instruction and reassembling each recovered segment of the first control instruction into the first control instruction so as to recover the schedule; and storing the presentable message and recovered schedule in the subscriber station, wherein the subscriber station becomes programmed to present the presentable message according to the schedule.

24. The method of claim 23, further comprising:

maintaining message-presentation statistics in the subscriber station;

receiving into the subscriber station a request for the message-presentation statistics; and the subscriber station transmitting the message-presentation statistics to a remote entity.

25. The method of claim 24, wherein the request defines a network address of the remote entity.

26. The method of claim 24, wherein the presentable message includes an embedded web-link, and wherein the message-presentation statistics comprise a count of a number of times the embedded web-link is invoked.

27. The method of claim 23, wherein the presentable message comprises an advertisement.

28. The method of claim 23, further comprising:
receiving into the subscriber station, from the communications network, a second plurality of SMS messages, wherein each SMS message of the second plurality of SMS messages includes a respective segment of a plurality of segments of a second control instruction, and wherein the second control instruction contains a schedule-change order defining a change to the schedule for presentation of the presentable message;
recovering, from the second plurality of SMS messages, each segment of the second control instruction and reassembling each recovered segment of the second control instruction into the second control instruction so as to recover the schedule-change order; and
the subscriber station implementing the change and thereby becoming programmed to present the presentable message according to a modified schedule.

29. The method of claim 28, wherein the schedule-change order comprises (i) a cancellation-order defining an instruction to cancel the schedule and (ii) and a schedule-order defining the modified schedule.

30. The method of claim 29, wherein implementing the change comprises:
deleting the schedule; and
storing the modified schedule.

* * * * *